United States Patent [19]

You

[11] Patent Number: 5,273,279
[45] Date of Patent: Dec. 28, 1993

[54] RACKET FRAME OF PLASTIC COMPOUND MATERIAL

[76] Inventor: Chin-San You, No. 3, Lane 1029, Feng-Shyn Road, Feng Yuan City, Taichung Hsien, Taiwan

[21] Appl. No.: 899,987

[22] Filed: Jun. 17, 1992

[51] Int. Cl.⁵ ............................................. A63B 49/10
[52] U.S. Cl. .................. 273/73 F; 273/73 G; 273/DIG. 23
[58] Field of Search ............ 273/73 R, 73 C, 73 F, 273/73 G, DIG. 23; 264/257

[56] References Cited

U.S. PATENT DOCUMENTS

| | | | |
|---|---|---|---|
| 4,511,523 | 4/1985 | Hsu | 273/73 F X |
| 5,071,125 | 10/1991 | Shen | 273/73 R |
| 5,114,145 | 5/1992 | Yamaguchi et al. | 273/73 F |
| 5,174,568 | 12/1992 | You | 273/73 F |
| 5,176,868 | 1/1993 | Davis | 264/257 |

Primary Examiner—V. Millin
Assistant Examiner—Raleigh W. Chiu
Attorney, Agent, or Firm—Browdy and Neimark

[57] ABSTRACT

A racket frame of plastic compound material has a shaft and a head frame coupled with the shaft. Such racket frame is provided with a hollow shell body having a first portion making up the shaft and a second portion forming the head frame. The first portion is furnished with at least a layer of fiber-reinforced plastic material which is made from a thermoplastic plastic as a matrix and reinforced by a long fiber reinforcing material. The second portion contains at least a layer of fiber-reinforced plastic material which is made from a thermosetting plastic as a matrix and reinforced by a long fiber reinforcing material. The first and the second portions are joined together to form a junction which is wrapped around by the fiber-reinforced plastic material of the second portion. The racket frame so made is provided with superior qualities of strength, stiffness, bouncing capability, toughness, and shock-absorbing capability.

5 Claims, 3 Drawing Sheets

RACKET FRAME OF PLASTIC COMPOUND MATERIAL

BACKGROUND OF THE INVENTION

The present invention relates to a game racket, and more particularly to a game racket frame of plastic compound material.

Based on the types of materials and manufacturing methods used, the conventional game rackets of the prior art are, in general, classified into two kinds. The first kind of the game racket is made mainly from the long fiber fabrics, which are preimpregnated in a thermosetting resin and are subsequently treated in a molding tool under heat and pressure to take form of a game racket. Such racket is generally provided with a good rigidity; nevertheless it has a poor shock-absorbing capability and a mediocre quality of toughness. The second kind of the game racket is made from a mixture containing short fibers and thermoplastic materials. The racket is made from such mixture by injection method and is provided with good toughness and shock-absorbing property but with inadequate strength and stiffness.

SUMMARY OF THE INVENTION

It is, therefore, the primary objective of the present invention to provide a game racket frame of plastic compound material with superior qualities characteristic of a game racket which is made from the matrixes of thermosetting plastic and thermoplastic plastic materials and is reinforced by means of long fiber materials.

In keeping with the principles of the present invention, the foregoing objective of the present invention is accomplished by a game racket frame of plastic compound material having a shaft and a head frame attached to one end of the shaft. Such racket is characterized in that it comprises a hollow shell body having a first portion making up the shaft and having a second portion forming the head frame. The first portion is composed of at least a layer of fiber-reinforced plastic made from a thermoplastic plastic material as a matrix and reinforced by a long fiber reinforcing material. The second portion consists of at least a layer of fiber-reinforced plastic material made from a thermosetting plastic matrix and reinforced by a long fiber reinforcing material. The first portion is coupled with the second portion in such a manner that one end of the former is enclosed by a reinforcing layer of plastic fiber of the latter. Such game racket is unique in that it has a sweet spot of good strength, excellent stiffness, and superior bouncing capability, and that it has a tough shaft which is less vulnerable to breakage and has a good shock-absorbing capability.

The foregoing objective and features of the present invention will be better understood by studying the following detailed description of a preferred embodiment of the present invention in conjunction with the drawings provided herewith.

DETAILED DESCRIPTION OF THE PREFERRED EMBODIMENTS

Figure 1:
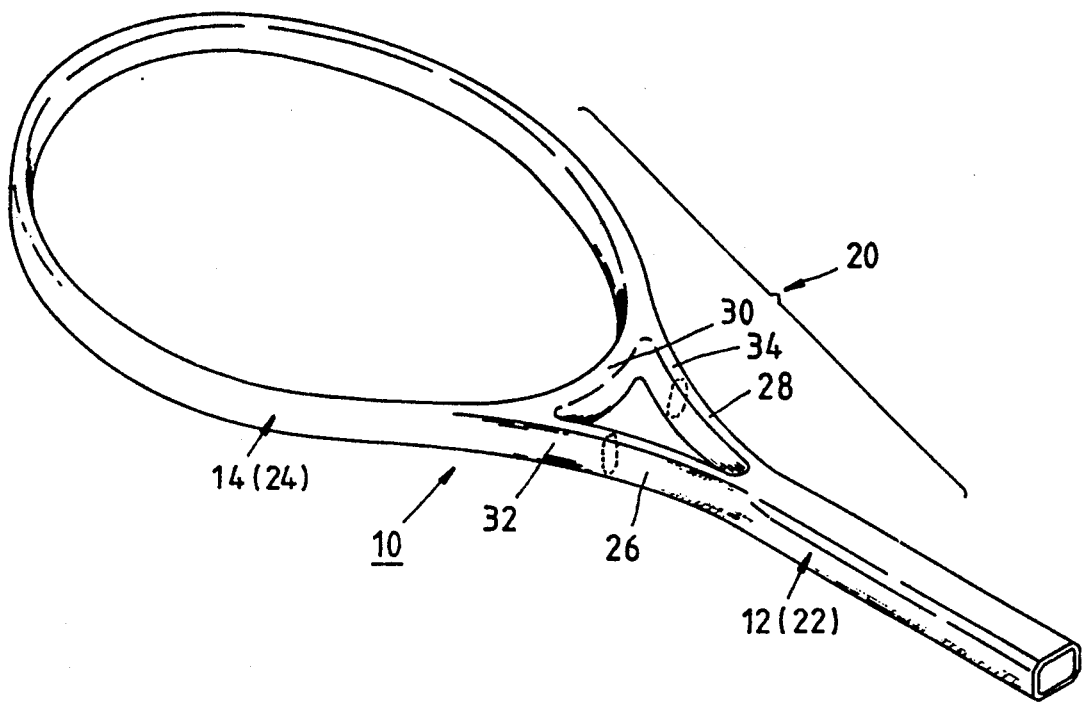
FIG. 1 shows a three-dimensional view of a game racket frame embodied in the present invention.
Figure 2:
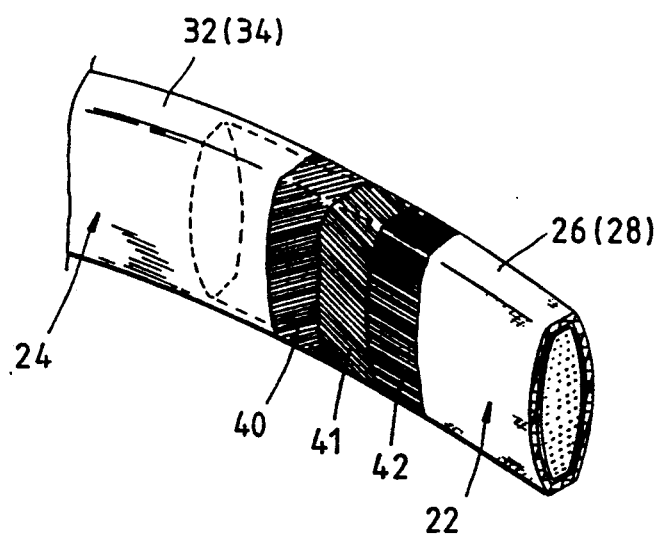
FIG. 2 shows an enlarged view of a portion of the racket frame of the present invention.
Figure 3:
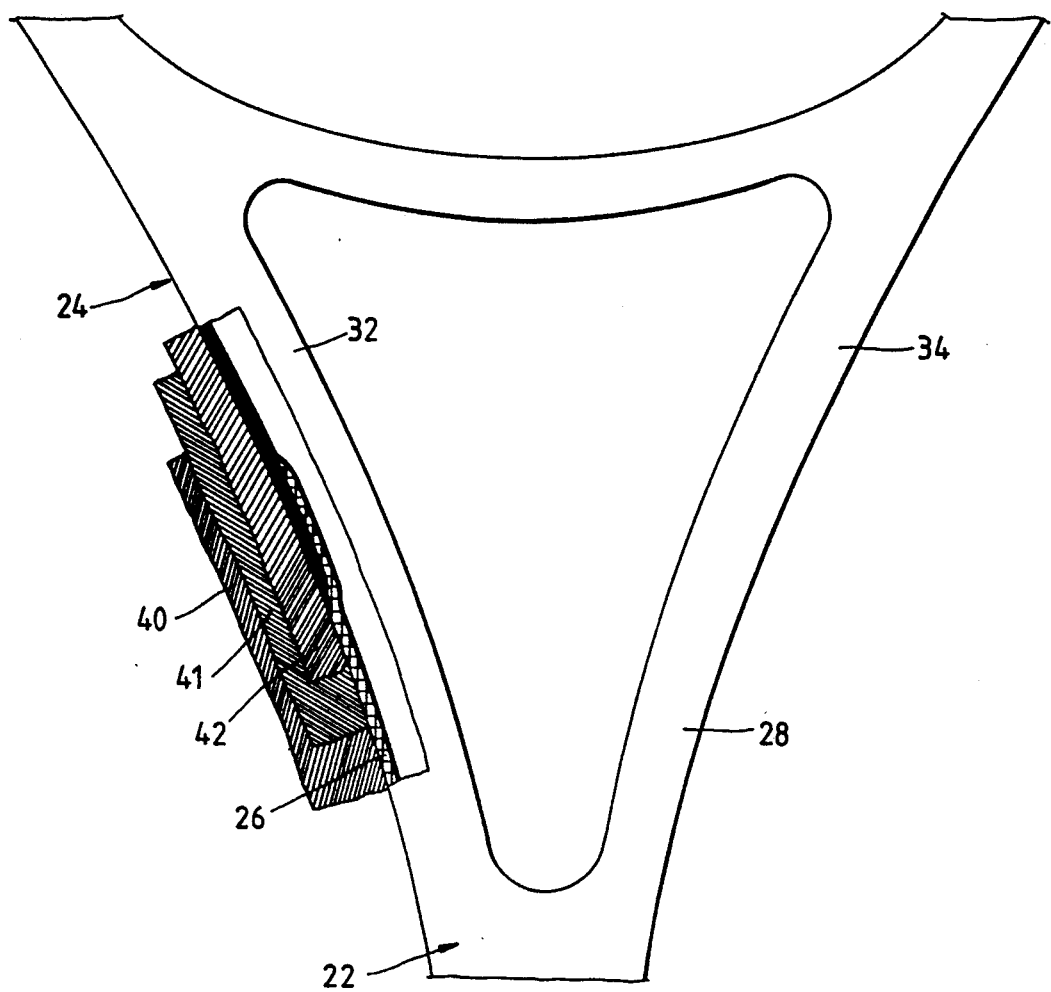
FIG. 3 shows a sectional view of a portion of the racket frame of the present invention.

Referring to FIGS. 1–6, a racket frame 10 of plastic compound material of the present invention is shown comprising a shaft 12 and a head frame 14 coupled with one end of the shaft 12.

The racket frame 10 comprises a shell body 20 made up of a first portion 22 and a second portion 24 coupled with the first portion 22.

The first portion 22 forms the shaft 12 and has one end provided with the two front branches 26 and 28. The second portion 24 makes up the head frame 14 and has a jaw portion 30 provided with the two open ends 32 and 34 which are intended for use in coupling with the two front branches 26 and 28 of the shaft 12.

In the process of making the first portion 22, a plurality of multifilament binding yarns of nylon and a plurality of fabric sheets which are made of 12K carbonaceous fiber commingled with the multifilament binding yarn and have an outer diameter of 3 inches are stacked together in a winding manner to form a primitive first portion 22, which is subsequently placed in a molding tool to receive a treatment under a temperature of 280° C. and an appropriate internal or external pressure for a period of 20 minutes. Thereafter, the treated primitive first portion 22 is permitted to cure at the room temperature so as to form a finished first portion 22 making up the racket frame 10 of the present invention.

A primitive second portion 24 is made from a plurality of carbonaceous fiber fabric sheets which are preimpregnated in epoxy resin and are stacked together windingly. Such primitive second portion 24 is arranged in such a manner that the fabric sheets 40, 41 and 42 located correspondingly to the open ends 32 and 34 are permitted to wrap around the two front branches 26 and 28 of the first portion 22. Along with the first portion 22 which was already made previously, the primitive second portion 24 is then placed in a molding tool having a shape of the racket frame 10, in which both the finished first portion 22 and the primitive second portion 24 are subjected to a treatment under a temperature of 160° C. and an appropriate internal or external pressure for a period of 15 minutes before they are permitted to cure to form a racket frame 10 having a finished second portion 24 fastened securely with the first portion 22.

Therefore, the head frame 14 of the racket frame 10 is provided with the excellent qualities of a head frame made from a thermosetting plastic matrix and reinforced by a long fiber reinforcing material. The shaft 12 of the racket frame 10 is therefore provided with superior qualities of a shaft made from a thermoplastic plastic matrix and reinforced by a long fiber reinforcing material. On the basis of the testing results, the racket frame 10 of the present invention is found to have several advantages over the prior art racket frame of plastic compound material. The advantages are further expounded explicitly hereinafter.

Figure 4:
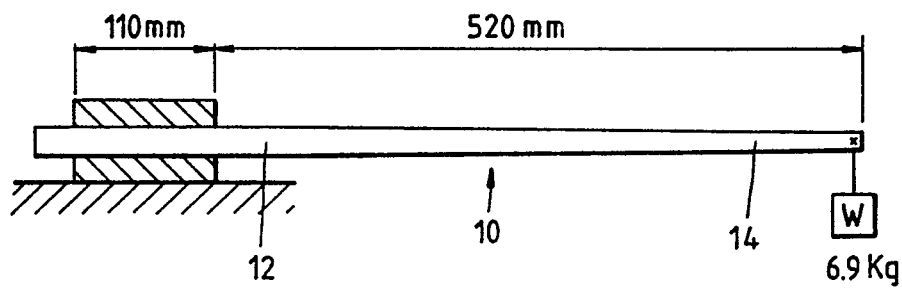
FIG. 4 is a schematic view showing that the racket frame of the present invention is put to the test of stiffness.

According to a stiffness test as shown in FIG. 4, a portion of 110 mm of the shaft 12 of the racket frame 10 was locked securely in such a manner that it was separated from the head frame 14 by a distance of 520 mm. The head frame 14 was then burdened with a weight of 6.9 kg for a period of one minute. The result showed that the distortion quantity of the racket frame 10 was 72RA, which was less than the distortion quantity of 75RA obtained in a similar test of a prior art racket frame. It is therefore apparent that the racket frame 10 of the present invention has a quality of stiffness superior to that of the prior art racket frame.

Figure 5:
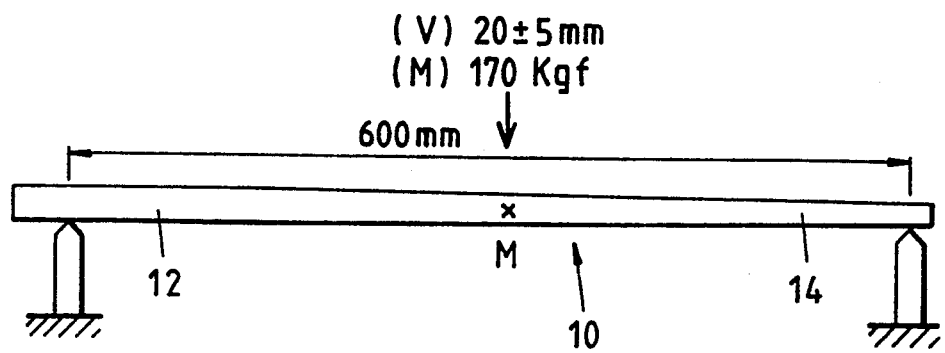
FIG. 5 is a schematic view showing that the racket frame of the present invention is put to the test of strength.

As shown in FIG. 5 illustrating a testing of the strength of the shaft 12, there were two fulcrums located respectively at one end of the shaft 12 and at a top portion of the head frame 14 in such a manner that they were separated by a distance of 600 mm. A gravity force of 170 kgf was exerted on a midpoint M between the two fulcrums at a velocity of 20+5 mm per minute. The test result showed that the racket frame 10 in question was found to have suffered no damage at all. A prior art racket frame of plastic compound material was tested in a similar manner as described above under a gravity force of 120 kgf and was subsequently found to have suffered a structural damage.

Figure 6:
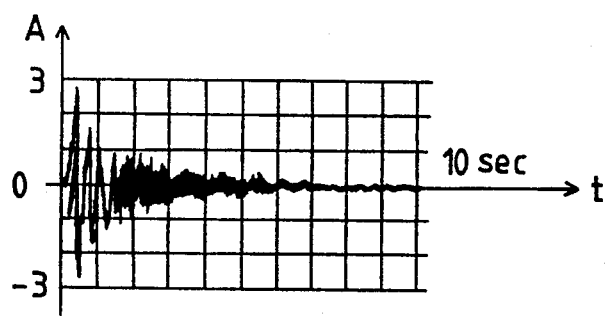
FIG. 6 is a diagram illustrating a result of vibration-attenuating test of the racket frame of the present invention.
Figure 7:
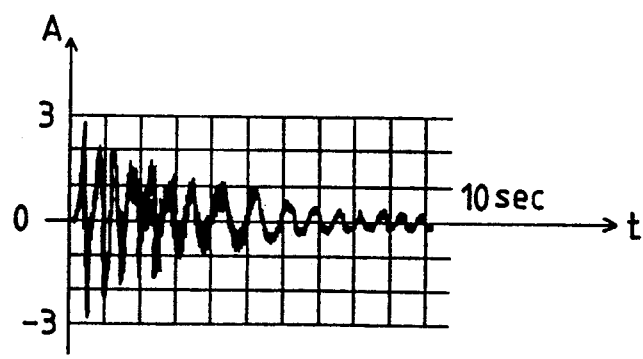
FIG. 7 shows a diagram of a result of the vibration-attenuating test of a prior art racket frame of plastic compound material.

The results of vibration-attenuating tests of the racket frame 10 of the present invention and the prior art racket frame showed that the racket frame 10 of the present invention has a shock-absorbing capability superior to that of the prior art racket frame, as shown in FIGS. 6 and 7.

What is claimed is:

1. A racket frame of plastic compound material comprising:

a shaft and a head frame joined to said shaft; said racket frame including a hollow shell body having a first portion making up said shaft and a second portion forming said head frame, an end of said first portion having two branches, said second portion having a jaw portion with two open ends, said first portion provided with at least a layer of fiber-reinforced plastic material which is made from a thermoplastic plastic as a matrix and reinforced by a long fiber reinforcing material, said second portion provided with at least a layer of fiber-reinforced plastic material which is made from a thermosetting plastic as a matrix and reinforced by a long fiber reinforcing material, said two branches respectively coupled with said two open ends of said second portion in such a manner that each end of said two branches is wrapped around by and in direct contact with said fiber-reinforced plastic material of said second portion.

2. The racket frame of plastic compound material according to claim 1 wherein said thermoplastic plastic of said first portion is a thermoplastic multifilament binding yarn and wherein said long fiber reinforcing material of said first portion is commingled with said thermoplastic multifilament binding yarn.

3. The racket frame of plastic compound material according to claim 1 wherein said fiber-reinforced plastic material of said second portion is made from a long fiber fabric sheet preimpregnated in a thermosetting resin.

4. The racket frame of plastic compound material according to claim 1 wherein said thermoplastic plastic of said first portion has a melting point higher than a curing point of said thermosetting plastic of said second portion.

5. The racket frame of plastic compound material according to claim 3 wherein said first portion and said second portion are coupled to form a junction which is wrapped with at least a layer of said long fiber fabric sheet preimpregnated in said thermosetting resin.

* * * * *